(12) United States Patent
Joisha et al.

(10) Patent No.: US 7,086,040 B2
(45) Date of Patent: Aug. 1, 2006

(54) METHOD FOR ARRAY SHAPE INFERENCING FOR A CLASS OF FUNCTIONS IN MATLAB

(75) Inventors: Pramod G. Joisha, Evanston, IL (US); Prithviraj Banerjee, Glenview, IL (US); Nagaraj Shenoy, Karnataka (IN)

(73) Assignee: Northwestern University, Evanston, IL (US)

( * ) Notice: Subject to any disclaimer, the term of this patent is extended or adjusted under 35 U.S.C. 154(b) by 473 days.

(21) Appl. No.: 09/773,211

(22) Filed: Jan. 30, 2001

(65) Prior Publication Data

US 2004/0019881 A1    Jan. 29, 2004

(51) Int. Cl.
*G06F 9/45* (2006.01)

(52) U.S. Cl. ............ 717/137; 717/141; 717/136; 717/140

(58) Field of Classification Search ........ 717/100–178, 717/9; 708/270; 711/172
See application file for complete search history.

(56) References Cited

U.S. PATENT DOCUMENTS

| | | | |
|---|---|---|---|
| 5,142,681 A * | 8/1992 | Driscoll et al. | 717/141 |
| 5,278,986 A * | 1/1994 | Jourdenais et al. | 717/149 |
| 5,781,779 A * | 7/1998 | Gilbert et al. | 717/147 |
| 5,943,691 A * | 8/1999 | Wallace et al. | 711/172 |
| 6,016,397 A * | 1/2000 | Ogasawara et al. | 717/160 |
| 6,233,540 B1 | 5/2001 | Schaumont et al. | |
| 6,675,378 B1 * | 1/2004 | Schmidt | 717/154 |
| 2001/0044930 A1 * | 11/2001 | Miyata et al. | 717/9 |
| 2001/0051966 A1 * | 12/2001 | Pelton et al. | 708/270 |
| 2004/0019883 A1 * | 1/2004 | Banerjee et al. | 717/152 |

OTHER PUBLICATIONS

Menon et al. "A Case for Source-Level Transformations in MATLAB," Dec. 1999, ACM, vol. 35 Issue 1, pp. 53-65.*
Menon et al., "High-level semantic optimization of numerical codes," ACM, May 1999, pp. 434-443.*
DeRose et al., "Techniques for the translation of MATLAB programs into Fortran 90," Mar. 1999, ACM Transactions on Programming Languages and Systems (TOPLAS), vol. 21 Issue 2 , pages.*
Joisha et al., "Handling Context-Sensitive Syntactic Issues in the Design of a Front-End for a MATLAT Compiler," APL conference, 4/20.*
Shenoy et al., A System-level Synthesis Algorithm with Guaranteed Solution Quality, 2000, ACM.*
Rose et al., A MATLAB to Fortran 90 Translator and its Effectiveness, ACM, 1996.*

(Continued)

*Primary Examiner*—Kakali Chaki
*Assistant Examiner*—Insun Kang
(74) *Attorney, Agent, or Firm*—The Law Office of Deepti Panchawagh-Jain

(57) ABSTRACT

A method for inferring the shape and dimension of arrays for high-level, array-based languages such as MATLAB is presented. The method uses the algebraic properties that underlie MATLAB's shape semantics and infers the shape that the program expression assumes. In one embodiment, a shape-tuple of the result of a program expression is inferred by creating a shape-tuple expression comprising the shape-tuples of the operands and the shape-tuple operator.

10 Claims, 5 Drawing Sheets

OTHER PUBLICATIONS

Bouet et al., Shape Representation for Image Retrieval, ACM, 1999.*

Haldar et al., match Virtual machine: An Adaptive Runtime System to execute MATLAB in Parallel, IEEE, 2000.*

Rose et al., Techniques for the Translation of MATLAB Programs into Fortran 90, ACM, 1999.*

Menon et al., A Case for Source-Level Transformation in MATLAB, ACM, Dec. 1999.*

Menon et al., High-level Semantic Optimization of Numerical Codes, ACM, 1999.*

P. Joisha, A. Kanhere, P. Banerjee, U.N. Shenoy, A. Choudhary; "Handling Context-Sensitive Syntactic Issues in the Design of a Front-End for a MATLAB Compiler", APL Conference, Berlin Germany, Apr. 2000, 15 pages, Center for Parallel and Distributed Computing.

P. Joisha, U.N. Shenoy, P. Banerjee "An Approach to Array Shape Inferencing in MATLAB" Technical Report No. CPDC-TR-2000-10-010, Oct. 2000, 30 pages, Center for Parallel and Distributed Computing, Northwestern University, Evanston, IL USA.

* cited by examiner

| Operator | Rank |
|---|---|
| a*b <br> a+b <br> a-b <br> a.*b <br> a.^b <br> a./b <br> a.\b <br> a==b <br> a~=b <br> a<b <br> a>b <br> a<=b <br> a>=b <br> a&b <br> a\|b <br> a/b <br> a\b <br> [a, b] <br> [a; b] | $\max(R(a), R(b))$ |
| +a <br> -a <br> ~a <br> a' <br> a.' | $R(a)$ |
| c(:) ← a | $R(c)$ |
| a^b <br> a(:) <br> rand | 2 |
| a:b <br> rand(a, b) <br> ones(a, b) | 2 |
| a(e) | $R(e)$ |
| a($e_1, e_2, \ldots, e_n$) <br> rand($e_1, e_2, \ldots, e_n$) <br> ones($e_1, e_2, \ldots, e_n$) | $n$ |
| c(e) ← a | $\max(R(a), R(c))$ |
| c($e_1, e_2, \ldots, e_n$) ← a | $\max(n, R(c))$ |

FIG. 4

| MATLAB Expression $e$ | Shape Expression | $\bar{\theta}(e)$ | $u$ |
|---|---|---|---|
| a*b | $s \circledast t$ | $\bar{\theta}(a)\bar{\theta}(b)(1-(1-\bar{\alpha}(a))$ $(1-\bar{\alpha}(b))(1-\bar{\beta}(a)\bar{\beta}(b)$ $\delta(\Psi s \Psi \Gamma_1 - t\Gamma_1)))$ | $(1-\bar{\theta}(e))\pi^* + \bar{\theta}(e)(s^*\bar{\alpha}(b)+$ $t^*\bar{\alpha}(a)(1-\bar{\alpha}(b)) + (s^*\Gamma_1+$ $t^*\Gamma_2 + I - \Gamma_1 - \Gamma_2)(1-\bar{\alpha}(a))$ $(1-\bar{\alpha}(b)))$ |
| a+b<br>a-b<br>a.*b<br>a.^b<br>a./b<br>a.\b<br>a==b<br>a~=b<br>a<b<br>a>b<br>a<=b<br>a>=b<br>a&b<br>a\|b | $s \dot{\oplus} t$ | $\bar{\theta}(a)\bar{\theta}(b)(1-(1-\bar{\alpha}(a))$ $(1-\bar{\alpha}(b))(1-\delta(s-t)))$ | $(1-\bar{\theta}(e))\pi^* + \bar{\theta}(e)(s^*\bar{\alpha}(b)+$ $t^*(1-\bar{\alpha}(b)))$ |
| +a<br>-a<br>~a | $\dot{\iota} s$ | $\bar{\theta}(a)$ | $s^*$ |
| a^b | $s \dot{\odot} t$ | $\bar{\theta}(a)\bar{\theta}(b)(1-(1-\bar{\alpha}(a)\bar{\beta}(b)$ $\delta(t\Gamma_1 - \Psi t\Psi\Gamma_1))$ $(1-\bar{\alpha}(b)\bar{\beta}(a)\delta(s\Gamma_1-$ $\Psi s \Psi \Gamma_1)))$ | $(1-\bar{\theta}(e))\pi^* + \bar{\theta}(e)$ $(s^*\bar{\alpha}(b) + t^*(1-\bar{\alpha}(b)))$ |
| a'<br>a.' | $\neg s$ | $\bar{\beta}(a)$ | $(1-\bar{\theta}(e))\pi^* + \bar{\theta}(e)\Psi s^*\Psi$ |
| a/b | $s \dot{\oslash} t$ | $\bar{\theta}(a)\bar{\theta}(b)(1-\bar{\alpha}(b))(1-\bar{\alpha}(a)$ $(1-\bar{\beta}(b)))(1-\bar{\beta}(a)\bar{\beta}(b)$ $\delta(s\Gamma_2 - t\Gamma_2))$ | $(1-\bar{\theta}(e))\pi^* + \bar{\theta}(e)(s^*\bar{\alpha}(b)+$ $t^*(1-\beta(b)) + (s^*\Gamma_1 + I -$ $\Gamma_1 - \Gamma_2 + \Psi t^*\Psi\Gamma_2)(1-\bar{\alpha}(b))\beta(b)$ |
| a\b | $s \dot{\oslash} t$ | $\bar{\theta}(a)\bar{\theta}(b)(1-\bar{\alpha}(a))(1-\bar{\alpha}(b)$ $(1-\bar{\beta}(a)))(1-\bar{\beta}(a)\bar{\beta}(b)$ $\delta(s\Gamma_1 - t\Gamma_1))$ | $(1-\bar{\theta}(e))\pi^* + \bar{\theta}(e)(t^*\bar{\alpha}(a)+$ $s^*(1-\beta(a)) + (\Psi s^*\Psi\Gamma_1 + I-$ $\Gamma_1 - \Gamma_2 + t^*\Gamma_2)(1-\bar{\alpha}(a))\beta(a)$ |
| [a; b] | $s \dot{\ominus} t$ | $\bar{\theta}(a)\bar{\theta}(b)\delta(s(I-\Gamma_1)-$ $t(I-\Gamma_1))$ | $(1-\bar{\theta}(e))\pi^* + \bar{\theta}(e)$ $(s^* + t^*\Gamma_1)$ |
| [a, b] | $s \dot{\ominus} t$ | $\bar{\theta}(a)\bar{\theta}(b)\delta(s(I-\Gamma_2)-$ $t(I-\Gamma_2))$ | $(1-\bar{\theta}(e))\pi^* + \bar{\theta}(e)$ $(s^*\Gamma_2 + t^*)$ |

FIG. 5

| Shape-Tuple Class Operator | Identity | Associativity | Commutativity | Idempotent Law |
|---|---|---|---|---|
| ⊛ | $i$ | ✗ | ✗ | ✗ |
| ⊕ | $i$ | ✓ | ✓ | ✓ |
| ↲ | - | - | - | - |
| ⊙ | $i$ | ✓ | ✓ | ✗ |
| ¬ | - | - | - | - |
| ⊘ | ✗ | ✗ | ✗ | ✗ |
| ○ | ✗ | ✗ | ✗ | ✗ |
| ⊚ | ✗ | ✓ | ✓ | ✗ |
| ⊖ | ✗ | ✓ | ✓ | ✗ |

FIG. 6

METHOD FOR ARRAY SHAPE INFERENCING FOR A CLASS OF FUNCTIONS IN MATLAB

STATEMENT REGARDING FEDERALLY SPONSORED RESEARCH OR DEVELOPMENT

This invention was made with Government support by Defense Advanced Research Projects Agency (DARPA) under Contract Number F30602-98-2-0144. The Government may have certain rights in the invention.

FIELD OF INVENTION

The invention relates to the compilation of array-based languages, particularly to schemes that infer array shapes at compile time in languages such as MATLAB and APL.

BACKGROUND OF INVENTION

Certain high-level languages, such as MATLAB, SETL and APL, enjoy immense popularity in domains such as signal and image processing, and are often the language of choice for fast prototyping, data analysis and visualization. MATLAB is a proprietary programming language due to The Math Works, Inc. The simplicity and ease of use of the language, coupled with the interactive nature of the MATLAB system makes it a productive environment for program development and analysis. However, MATLAB is slow in execution. One solution to the problem is to develop compilers that translate MATLAB programs to C code, and to then compile the generated C code into machine code that runs much faster than the original MATLAB source. This approach is a difficult one, primarily because the MATLAB language lacks program declarations. Therefore, any automated approach would have to first contend with the problems of automatic type and shape inferencing.

Array shape inferencing refers to the problem of deducing the dimensionality and extents of an array's shape at compile time. Shape inferencing in languages such as MATLAB is a difficult task, primarily due to the fact that such languages do not explicitly declare the shape of an array. On account of the dynamic binding of storage to names and the run time changes in basic data type and shape that these languages allow, interpreters are typically used to cope with their translation. Hence, shape inferencing is desirable from the standpoint of program compilation, since inferred shapes enable compile-time array conformability checking, memory preallocation optimizations, and efficient translations to "scalar" target languages.

When the shape of a MATLAB program variable is not statically determinable, researchers have usually approached the problem by generating code that performs the inference at execution time. This code relies on ancillary variables called shadow variables that the compiler generates. The methodology is described in Luiz Antonio De Rose's Ph.D. dissertation titled *Compiler Techniques for MATLAB Programs,* and in the journal paper titled *Techniques for the Translation of MATLAB Programs into Fortran* 90 by Luiz Antonio De Rose and David A. Padua. Both of these works are incorporated by reference herein. Though such an approach is robust, it does not offer an opportunity for propagating an expression's shape across statements, when the expression's shape is unknown at compile time. That is, once shadow variables are introduced, useful shape information that could otherwise be propagated across expressions gets obscured.

Previous attempts at automated approaches to inferencing revolved around the type determination problem. These were based on special mathematical structures called lattices. These structures are described in standard texts on discrete mathematics. Among the first of these attempts was type inferencing work by Marc A. Kaplan and Jeffrey D. Ullman. In a paper titled *A Scheme for the Automatic Inference of Variable Types,* which is hereby incorporated by reference, they proposed a general mathematical framework based on the theory of lattices that automatically inferred the types of variables in a model of computation that was an abstraction of programming languages such as APL, SETL and SNOBOL. Though the Kaplan et al. procedure can be carried over to MATLAB in a straightforward manner to also solve the problem of type inferencing, the same cannot be said as far as shape inferencing is concerned. For the Kaplan et al. approach to work, the type functions that model the type semantics of the language's operators must be monotonic with respect to the defined lattice. For some of MATLAB's built-in functions such as matrix multiply, it can be shown that the shape-tuple function that models the operation's shape semantics will not be monotonic with respect to any lattice that can be defined on the set of shape-tuples. Thus, existing lattice-based techniques have only limited scope for array shape inferencing in MATLAB.

SUMMARY OF INVENTION

This invention relates to an improved method using which array shape inferencing can be performed in the MATLAB programming language. Specifically, by algebraically representing the shape of a MATLAB expression, the invention provides a compact compile-time representation of shape, which does not obscure useful shape information from being propagated. The representation is exact in the sense that it does not depend on any compile-time overestimates for shape. This enables optimal memory allocation at run time. The representation reveals useful properties borne by MATLAB's built-in operations that can be leveraged for generating better code. Specific examples include avoiding array conformability checking at run time, preallocating memory for arrays, and enabling translation to equivalent scalarized forms.

BRIEF DESCRIPTION OF DRAWINGS

FIG. 4 shows how array ranks can be computed for various built-in functions in MATLAB. In each case, the array ranks are determined as some function of the array ranks of the operands.

FIG. 5 shows a representative list of shape-predicate and shape-tuple expressions for various built-in functions in MATLAB. These expressions mathematically model the correctness and the array extent aspects of shape respectively.

FIG. 6 summarizes the algebraic properties that the shape-tuple class operators possess.

DETAILED DESCRIPTION OF PREFERRED EMBODIMENT

Figure 1:
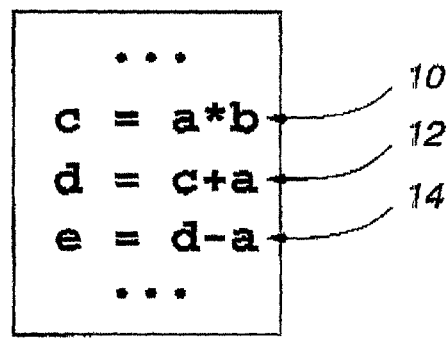
FIG. 1 shows a sample MATLAB code fragment.

In the conventional shape inferencing method, called the shadow variable process, various ancillary variables are introduced at compile time for inferring an array's shape at execution time. This process is illustrated by reference to a sample code fragment shown in FIG. 1. FIG. 1 shows an example of a MATLAB code fragment with assignment statement 10, 12, and 14. In statement 10, program variables a and b are operated by MATLAB's matrix multiply built-in function and the result is assigned to a program variable c. In statement 12, c and a are operated by the array addition built-in function and the result is assigned to d. Finally, statement 14 applies MATLAB's array subtraction operation to d and a and assigns the result to e.

When the shapes of the program variables a and b are unknown at compile time, the conventional shadow variable approach will simply generate temporaries that represent the extents of c, d and e along their respective dimensions. The approach would then generate code against c, d and e that performs run-time array conformability checking for each of the assignments. However, even when array shapes are unknown at compile time, useful inferences can be made that could be used to generate better code. For example, in the case of the code fragment in FIG. 1, it is possible to statically infer that if the assignment to d in statement 12 succeeds, the subsequent assignment to e in statement 14 will also succeed, and that both e and d would then have exactly the same shape. This enables the code generator to avoid generating array conformability checking code for the assignment to e, while the fact that d and e will always have the same shape can be exploited at a subsequent point in the program. The ability to perform such useful inferences under a general setting does not exist in the conventional shape inferencing method. A novel shape inferencing method with such abilities is illustrated in FIG. 2.

Figure 2:
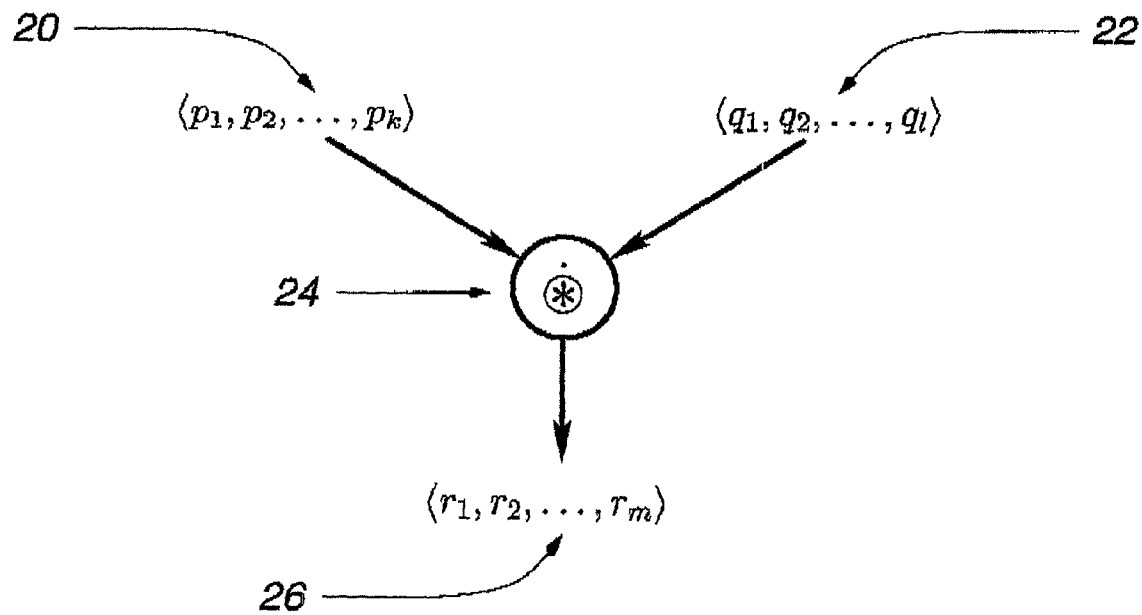
FIG. 2 illustrates the shape inferencing method according to the present invention.

A shape inferencing framework in accordance with the present invention is illustrated in FIG. 2. The notation $<p_1, p_2, \ldots, p_k>$ denotes the shape-tuple of a MATLAB expression 20. Each component $p_i$ in the shape-tuple representation denotes the extent along the ith dimension ($1 \leq i \leq k$) of a MATLAB expression. The shape-tuple notation 20 therefore lists the extents of an array from left to right in the order of increasing dimensions. The framework determines the shape-tuple 26 of a MATLAB expression, given the shape-tuples 20 and 22 of its operands. Every MATLAB built-in function can have its shape semantics modeled algebraically by a shape-tuple operator. This is shown by 24 in FIG. 2 for the specific case of MATLAB's matrix multiply operator *. That is, ⊛ is the shape-tuple operator that mimics the behavior of * in the shape domain. For instance, (2, 3)⊛(3, 5)=(2, 5) since when a 2×3 matrix is multiplied with a 3×5 matrix in MATLAB, the outcome is a 2×5 matrix. The "multiplication" in the last sentence refers to the MATLAB matrix multiply operation, which for the most part, shares the same semantics as the arithmetic matrix multiply operation taught in high-school mathematics.

Figure 3:
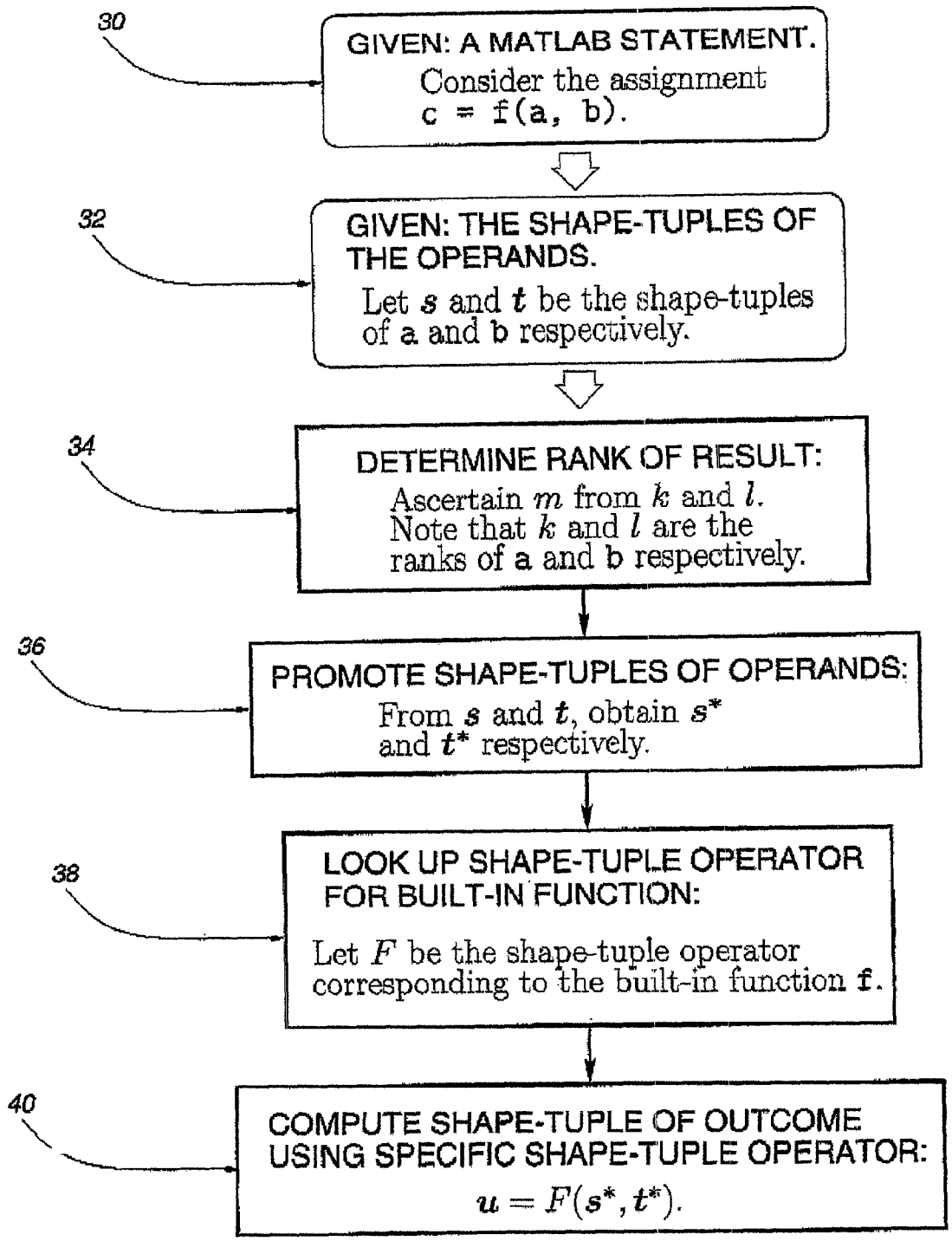
FIG. 3 shows a detailed flow chart of a preferred method in the shape inferencing process.

A more detailed illustration of the shape inferencing method is shown in FIG. 3. In step 30, a MATLAB statement c=f(a, b) is shown where f denotes a built-in function. In this statement, a and b are the operand expressions and s and t are their shape tuples. In 34, a rank m is determined from the known ranks k and l of the operands. The term "rank" as defined here refers to the number of components in the associated shape-tuple. Thus, given $s=<p_1, p_2, \ldots, p_k>$, $t=<q_1, q_2, \ldots, q_l>$, m needs to be determined first, and the shape-tuple u of c, $u=<r_1, r_2, \ldots, r_m>$, is determined next.

The computation of the rank m from the ranks k and l is dependent on the built-in function f. For example, if f in the above statement were the rand operator, then m would be 2. If f is MATLAB's array addition operator, then m would be max(k, l). FIG. 4 documents the rank calculations for various built-in functions in MATLAB. In FIG. 4, R(a) and R(b) represent the ranks of a and b respectively. In situations where R(c) is used, a reaching definition for c is expected.

After the rank of the result is computed 34, each of the shape-tuples s and t are "promoted" to m components, to produce s* and t* respectively. This promotion is performed in step 36 of the flow chart and may involve an expansion or truncation of the shape-tuples depending on whether m>k, l or m<k, l. In the case m>k or m>l, an expansion needs to be performed and this occurs by appending trailing extents of unity. For example, when <3, 2, 1> is expanded to 5 components, <3, 2, 1, 1, 1> is obtained. When <3, 2, 1> needs to be truncated to 2 components, <3, 2> is obtained. By construction, the ranks must be at least 2. This implies that all shape-tuples will consist of at least two components each.

The next step 38 is to determine which shape-tuple operator corresponds to the given built-in function. This is done by looking up a list of shape-predicate and shape-tuple expressions for the various built-in functions in MATLAB, as illustrated in FIG. 5. The column labeled u gives the particular expression that must be used to compute the shape-tuple of the result. In this computation, the shape-tuples are treated like integer square diagonal matrices as shown in Def. (1). Thus, the arithmetic involved in the computation of u is the usual matrix arithmetic.

$$\langle p_1, p_2, \ldots, p_n \rangle \stackrel{\Delta}{=} \begin{pmatrix} p_1 & 0 & \Lambda & 0 \\ 0 & p_2 & \Lambda & 0 \\ M & M & O & M \\ 0 & 0 & \Lambda & p_n \end{pmatrix}. \quad (1)$$

The quantities $\Gamma_1$, $\Gamma_2$ and I shown in FIG. 5 represent m×m integer square diagonal matrices. In $\Gamma_1$, only the first principal diagonal element is 1 and the rest are 0. In $\Gamma_2$, only the second principal diagonal element is 1 and the rest are zero. The m×m identity matrix is represented by I. Thus, in the shape-tuple notation, $\Gamma_1=<1, 0, 0, \ldots, 0>$, $\Gamma_2=<0, 1, 0, \ldots, 0>$ and $I=<1, 1, 1, \ldots, 1>$.

In FIG. 5, $\Psi$ denotes a special integer matrix called the elementary square matrix. In form, this matrix looks like $$\Psi \stackrel{\Delta}{=} \begin{pmatrix} 0 & 1 & 0 & \Lambda & 0 \\ 1 & 0 & 0 & \Lambda & 0 \\ 0 & 0 & 1 & \Lambda & 0 \\ M & M & M & O & M \\ 0 & 0 & 0 & \Lambda & 1 \end{pmatrix}. \quad (2)$$

Any square matrix premultiplied and postmultiplied with the elementary square matrix will have its first two principal diagonal elements interchanged. For example, $\Psi<2, 3, 4, 5>\Psi=<3, 2, 4, 5>$.

The last integer square diagonal matrix corresponds to the symbol $\pi^*$. Ill-formed expressions in MATLAB are considered to have the illegal shape-tuple $\pi^*$. For instance, when a 2×3 matrix is multiplied with a 4×5 matrix in MATLAB, the run-time system will complain of an error. The concept of an illegal shape-tuple is meant to abstract such error situations. A possible embodiment for $\pi^*$ is $$\pi^* = <\pi_1, \pi_2, 1, \ldots, 1>$$

where either $\pi_1$ or $\pi_2$ is a negative integer. The functions $\bar{\theta}$, $\bar{\alpha}$, $\bar{\beta}$ and $\delta$ shown in FIG. 3 are explained in the following text. The Dirac Delta function $\delta$ is defined on the integer domain Z as follows:

$$\delta(i) \triangleq \begin{cases} 0 & \text{if } i \neq 0, \\ 1 & \text{if } i = 0, \end{cases} \text{ where } i \in Z \quad (3)$$

This function is well described in standard mathematical literature. Essentially, it maps nonzero integers to 0, and 0 to 1. This is what Def. (3) indicates. The $\bar{\alpha}$ and $\bar{\beta}$ functions also produce 0/1 outcomes. They operate on MATLAB expressions and identify scalars and matrices respectively. Specifically, $$\bar{\alpha}(e) \triangleq \begin{cases} 1 & \text{if } e \text{ is a } MATLAB \text{ scalar,} \\ 0 & \text{otherwise,} \end{cases} \quad (4)$$

$$\bar{\beta}(e) \triangleq \begin{cases} 1 & \text{if } e \text{ is a } MATLAB \text{ scalar,} \\ 0 & \text{otherwise.} \end{cases} \quad (5)$$

For example, if e were a 2×3 MATLAB matrix, then $\bar{\alpha}(e)$ would be 0, while $\bar{\beta}(e)$ would be 1. It is possible to express the $\bar{\alpha}(e)$ and $\bar{\beta}(e)$ functions in terms of the shape-tuple components using the Dirac Delta function. This is shown in Eq. (6) and Eq. (7), where it is assumed that $<p_1, p_2, \ldots, p_k>$ represents the shape-tuple of e:

$$\bar{\alpha}(e) = \delta(p_1-1)\delta(p_2-1)\Lambda\delta(p_k-1), \quad (6)$$

$$\bar{\beta}(e) = \bar{\theta}(e)\delta(p_3-1)\Lambda\delta(p_k-1). \quad (7)$$

The $\bar{\theta}$ function distinguishes an ill-formed MATLAB expression from a well-formed one by mapping the former to 0 and the latter to 1. This function is called the shape-predicate. Put in another way, the shape-predicate will be 1 at run time for a well-defined MATLAB expression and 0 when a run-time error occurs. Various embodiments for the $\bar{\theta}$ function are possible. The specific embodiment chosen would depend on the choice for $\pi^*$ and does not affect the formulation of this framework.

The following example should clarify the steps in the process. Let us reconsider the MATLAB statement c←a*b shown in FIG. 1. Suppose that the shape-tuples associated with a and b are $s=<p_1, p_2>$ and $t=<q_1, q_2, q_3>$ respectively. Therefore, $$k = 2,$$

$$s = \begin{pmatrix} p_1 & 0 \\ 0 & p_2 \end{pmatrix},$$

and $$l = 3,$$

$$t = \begin{pmatrix} q_1 & 0 & 0 \\ 0 & q_2 & 0 \\ 0 & 0 & q_3 \end{pmatrix}.$$

From FIG. 4, we get $$m = \max(k, l).$$

Hence, $$m = 3.$$

Therefore $$s^* = \begin{pmatrix} p_1 & 0 & 0 \\ 0 & p_2 & 0 \\ 0 & 0 & 1 \end{pmatrix}.$$

$$t^* = \begin{pmatrix} q_1 & 0 & 0 \\ 0 & q_2 & 0 \\ 0 & 0 & q_3 \end{pmatrix}.$$

From Def.(6), we also have $$\bar{\alpha}(a) = \delta(p_1-1)\delta(p_2-1), \quad (8)$$

$$\bar{\alpha}(b) = \delta(q_1-1)\delta(q_2-1)\delta(q_3-1). \quad (9)$$

Looking up the shape-tuple operators in FIG. 5, we note the relevant shape-predicate and shape-tuple expressions for the MATLAB matrix multiply built-in function:

$$\bar{\theta}(c) = \bar{\theta}(a)\bar{\theta}(b)(1 - (1 - \bar{\alpha}(a))(1 - \bar{\alpha}(b))(1 - \bar{\beta}(a)\bar{\beta}(b)\delta(\Psi s \Psi \Gamma_1 - t\Gamma_1))), \quad (10)$$

$$u = (1 - \bar{\theta}(c))\pi * + \bar{\theta}(c) \quad (11)$$
$$(s * \bar{\alpha}(b) + t * \bar{\alpha}(a)(1 - \bar{\alpha}(b)) + (s * \Gamma_1 + t * \Gamma_2 + I - \Gamma_1 - \Gamma_2)(1 - \bar{\alpha}(a))(1 - \bar{\alpha}(b))).$$

In the above equations, the $\delta$ function operates on integer square diagonal matrices. This operation is achieved by extending the definition of the Dirac Delta function in Def.(3) to integer square diagonal matrices:

$$\delta(r_1, r_2, \ldots, r_m) \triangleq \delta(r_1)\delta(r_2)\Lambda\delta(r_m) \quad (12)$$

where $r_1, r_2, \ldots, r_m \in Z$. Plugging the expressions for $\bar{\alpha}(a)$ from Eq. (8) and for $\bar{\alpha}(b)$ from Eq. (9) into Eq. (10), we obtain $$\overline{\theta}(c) = \overline{\theta}(a)\overline{\theta}(b)(1 - (1 - \delta(p_1 - 1)\delta(p_2 - 1))(1 - \delta(q_1 - 1)\delta(q_2 - 1)\delta(q_3 - 1))$$

$$(1 - \overline{\theta}(a)\overline{\theta}(b)\delta(q_3 - 1)\delta(p_2 - q_1))).$$

Hence from Eq. (11), we get the shape-tuple u for c to be $$\{u\} = \begin{pmatrix} X & 0 & 0 \\ 0 & Y & 0 \\ 0 & 0 & Z \end{pmatrix} = \langle X, Y, Z \rangle, \text{ where}$$

$$X = \overline{\theta}(c)(p_1\overline{\alpha}(b) + q_1\overline{\alpha}(a)(1 - \overline{\alpha}(b)) + p_1(1 - \overline{\alpha})(a))(1 - \overline{\alpha}(b))) + (1 - \overline{\theta}(c))\pi_1.$$

$$Y = \overline{\theta}(c)(p_2\overline{\alpha}(b) + q_2\overline{\alpha}(a)(1 - \overline{\alpha}(b)) + q_2(1 - \overline{\alpha})(a))(1 - \overline{\alpha}(b))) + (1 - \overline{\theta}(c))\pi_2.$$

$$Z = \overline{\theta}(c)(\overline{\alpha}(b) + q_3\overline{\alpha}(a)(1 - \overline{\alpha}(b)) + (1 - \overline{\alpha})(a))(1 - \overline{\alpha}(b))) + (1 - \overline{\theta}(c)),$$

and where $\pi = \langle \pi_1, \pi_2, 1 \rangle$. Thus, if the respective values for $\langle p_1, p_2 \rangle$ and $\langle q_1 q_2, q_3 \rangle$ were $\langle 3, 2 \rangle$ and $\langle 4, 4, 1 \rangle$ at run time (say), $\overline{\theta}(c)$ would become 0, giving $\pi^*$ for u. The point is that we now have a compact compile-time representation for the shape-tuple of c that takes into account all possibilities.

In the above example, the shape-tuples s and t were used to compute the shape-tuple u. In general, the shape inferencing process will begin by considering the shape-tuples of all known scalar constants to be <1, 1, . . . , 1> and will then proceed to compute new shape-tuples by forward propagating the already computed shape-tuples.

The algebraic formulation in FIG. 5 of MATLAB's shape semantics has another advantage in addition to enabling a compact compile-time representation: It uncovers interesting algebraic properties borne by MATLAB's built-in functions in the shape domain. First of all, each of the shape-tuple operators shown in FIG. 5 form special mathematical structures called algebraic systems. Algebraic systems are discussed in standard texts on discrete mathematics. The book titled *Discrete Mathematical Structures with Applications to Computer Science* by J. P. Tremblay and R. Manohar is suggested as a reference.

Second, each of the shape-tuple operators shown in FIG. 5 exhibit a special characteristic known as the substitution property. We discuss this property by beginning with the notion of equivalent shape-tuples. In MATLAB, any m-dimensional array can always be considered as an n-dimensional array where m<n, simply by regarding the higher dimensions to have unit extents. Since higher dimensions are indicated to the right of lower dimensions in the shape-tuple notation, trailing extents of unity in a shape-tuple are effectively of no significance to an array's shape in MATLAB. In other words, the shape-tuples <2, 3, 4>, <2, 3, 4,1>, <2, 3, 4, 1, 1> and so on are all equally qualified to represent the shape of an array having three dimensions, with the extents 2, 3 and 4 along the first, second and third dimensions respectively. We therefore say that these shape-tuples are MATLAB-equivalent.

The concept of equivalent shape-tuples can be used to define an equivalence relation ℘ on the set of shape-tuples. Two shape-tuples $m_1$ and $m_2$ are said to be related by ℘ if they are MATLAB-equivalent. That is, $m_1$ ℘ $m_2$ if and only if either $m_1$ and $m_2$ are identical or differ by trailing extents of unity from the third component on. It can be shown that if. is a shape-tuple operator in FIG. 5, then $$(s\cdot t)\mathcal{P}(s't')$$

where s ℘ s' and t ℘ t'. What this means is that, if s and t in s t is substituted by the MATLAB-equivalent shape-tuples s' and t', then we are guaranteed to arrive at a shape-tuple that is MATLAB-equivalent to s·t. It is this particular characteristic that is called the substitution property. The substitution property is also documented in standard texts on discrete mathematics. This key observation enables us to substitute every shape-tuple operator by a shape-tuple class operator that works on the equivalence classes of the relation ℘. Relations such as ℘ that satisfy the substitution property with respect to some algebraic system are usually called congruence relations. Such relations enable the construction of new and simpler algebraic systems from a given algebraic system. For example, in the case of the ⊛ shape-tuple operator, we can consider the simpler shape-tuple class operator.

Each of the shape-tuple class operators can be shown to possess or not possess important algebraic properties. These algebraic properties are tabulated in FIG. 6. In the column labeled "Identity," i represents the class of shape-tuples equivalent to the scalar shape-tuple <1, 1>. Whenever a shape-tuple class operator • has the identity element i, the following will hold for all shape-tuple classes s:

$$s \bullet i = i \bullet s = s$$

These properties are exploited in the novel shape inferencing method as illustrated in the following examples.

Example 1

Comparisons with the Shadow Variable Approach

Let us reconsider the code fragment shown in FIG. 1. In the shadow variable approach, the static inferencing mechanism will fail because the extents of the matrices a and b will not be known exactly at compile time. For both a and b, shadow variables will be generated at compile time to resolve the shape information at run time. The approach will not attempt to infer at compile time that if the assignment to d succeeds, the subsequent assignment to e will also succeed and that both e and d would then have the same shapes.

In the proposed framework, we obtain the following two equations corresponding to those two statements by looking up the table in FIG. 5:

$$u = st,  \quad (Eg:1.1)$$

$$v = ut. \quad (Eg: 1.2)$$

where s, t, u and v represent the shape-tuple classes of the program variables c, a, d and e respectively. By substituting Eq. (Eg:1.1) into Eq. (Eg:1.2), we obtain $$v = (st)t.$$

From FIG. 6, is associative. Therefore, $$v = s(tt).$$

From FIG. 6, satisfies the idempotent law. Therefore, the last equation becomes $$v = st. \quad (Eg:1.3)$$

Comparing Eq.(Eg:1.1) and Eq.(Eg:1.3), we therefore conclude $$v = u. \tag{Eg:1.4}$$

Thus, if the assignment to d succeeds (in which case u won't be π), the subsequent assignment to e will also succeed and then both e and d would have exactly the same shape. Therefore at run time, we need to only perform conformability checking for the first statement and not the second. Observe that this result is deducible by the framework, even when a and b are arbitrary arrays, not necessarily just matrices. Moreover, the fact that d and e will always have the same shape is an important inference that can be capitalized upon at a subsequent point in the program. Such generalized deductions are not easily possible in the conventional shadow variable scheme.

Example 2

Inferring in the Presence of Loops

Consider the following code fragment that involves a while loop:

$S_1$: a←Λ;
$S_2$: b←Λ;
$S_3$: while ( . . . ),
$S_4$: c←a.*b;
$S_5$: a←c;
$S_6$: end;

From statement $S_4$ and FIG. 5, we get $$u_i = s_{i-1} t \tag{Eg:2.1}$$

where $u_i$ and $s_i$ indicate the respective shape-tuple classes of c and a in the ith iteration (i>1) of the loop.

From statement $S_5$, we also have $$s_i = u_i \tag{Eg:2.2}$$

Hence, by substituting Eq.(Eg:2.1) into Eq.(Eg:2.2), we arrive at $$s_i = s_{i-1} t.$$

$$\therefore s_i = (s_{i-2} \bigcirc t) t.$$

From FIG. 6, is associative. Hence $$s_i = s_{i-2} (tt).$$

Applying the idempotent law, the last equation becomes $$s_i = s_{i-2} t.$$

Proceeding thus, we therefore arrive at the following:

$$s_i = s_0 t \text{ for all } i \geq 1. \tag{Eg:2.3}$$

The above result is important because it leads to the following useful inferences and optimizations:
1. If the assignments to a and b in statements $S_1$ and $S_2$ are shape correct, then the code fragment itself is shape correct so long as a and b are initially shape conforming with respect to the .* built-in function.
2. We now know that c's shape will remain the same throughout the loop's execution.
3. The result indicates that a could potentially change shape only at the first iteration.
4. The result therefore enables us to preallocate c and resize a before executing the loop.

Foregoing described embodiments of the invention are provided as illustrations and descriptions. They are not intended to limit the invention to the form described. In particular, it is contemplated that the invention described herein may be implemented equivalently in hardware, software, firmware, and/or using other available functional components or building blocks. Other variations and embodiments are possible in light of the above presentation, and it is thus intended that this Detailed Description not limit the scope of the invention, but rather by the claims that follow.

What is claimed is:

1. A computer-implemented method for inferring, prior to run-time, an array shape of a result of a program expression of a high-level array-based language, the method comprising:
    arranging an extent for each array dimension of each operand of the program expression of the high-level array-based language when the size of at least one of said each operand is unknown into an input shape-tuple of said each operand;
    identifying a program operator associated with said each operand in the program expression;
    mapping the program operator to an associated shape-tuple operator, wherein the shape-tuple operator is based upon the shape semantics of the program operator; and,
    inferring, prior to run-time, an array shape-tuple of the result of the program expression by creating a shape-tuple expression comprising the input shape-tuple of said each operand and the shape-tuple operator.

2. The computer implemented method of claim 1, wherein inferring, prior to run-time, the array shape-tuple of the result of the program expression by creating the shape-tuple expression comprising the input shape-tuple of said each operand and the shape-tuple operator comprises the steps of:
    determining a rank of the resulting shape-tuple; and,
    promoting the input shape-tuple of said each operand to an appropriate rank.

3. The computer implemented method of claim 2, wherein determining the rank of the resulting shape-tuple comprises the steps of:
    determining a rank of the input shape-tuple of said each operand;
    identifying an operator corresponding to said each operand; and
    determining the rank of the shape-tuple of the result of the program expression according to the operator and the rank of the input shape-tuple of said each operand.

4. The computer-implemented method of claim 2, wherein promoting the input shape-tuple of said each operand to the appropriate rank comprises the steps of:
    comparing the rank of the shape-tuple of the result of the program expression to the rank of the input shape-tuple of said each operand;
    responsive to the rank of the shape-tuple of the result of the program expression being greater than the rank of the input shape-tuple of said each operand, expanding the input shape-tuple of said each operand to correspond with the rank of the shape-tuple of the result of the program expression; and,
    appending trailing extents of the expanded input shape-tuple of said each operand with an appropriate value.

5. The computer-implemented method of claim 4, further comprising:

responsive to the rank of the shape-tuple of the result of the program expression being less than the rank of the input shape-tuple of said each operand, truncating the input shape-tuple of said each operand corresponding with the rank of the shape-tuple of the result of the program expression.

6. The computer-implemented method of claim 1, wherein the step of mapping the program operator to the associated shape-tuple operator comprises:

looking up, in a table, the shape-tuple operator corresponding to the program operator.

7. The computer-implemented method of claim 1, further comprising the step of calculating a shape predicate for the shape-tuple of the result of the program expression.

8. The computer-implemented method of claim 1, further comprising the steps of:

performing an array conformability check at run-time for a first program expression; and applying a result of the array conformability check to a second program expression.

9. The computer-implemented method of claim 8, further comprising the step of:

determining a relationship among the first program expression and the second program expression.

10. The computer-implemented method of claim 1, further comprising the step of:

preallocating storage for said each operand whose size is statically unknown, based upon the input shape-tuple of said each operand in a loop.

* * * * *

UNITED STATES PATENT AND TRADEMARK OFFICE
CERTIFICATE OF CORRECTION

PATENT NO. : 7,086,040 B2
APPLICATION NO. : 09/773211
DATED : August 1, 2006
INVENTOR(S) : Joisha et al.

It is certified that error appears in the above-identified patent and that said Letters Patent is hereby corrected as shown below:

On Sheet 1 of 5, in FIG. 1, below "FIG. 1" insert -- (Prior Art) --.

On Sheet 4 of 5, in FIG. 5 (Col. 2, Row 6, delete " [symbol] " and insert -- [symbol] --

In column 1, line 26, delete "Math Works," and insert -- MathWorks, --, therefor.

In column 3, line 41, delete "$p_j$" and insert -- $p_i$ --, therefor.

In column 4, line 66, delete "Π*.III" and insert -- Π*. III --, therefor.

In column 5 (Eq. 5), line 31, delete "scalar," and insert -- matrix, --, therefor.

In columns 5–6 (Eq. 11), lines 55–56, delete "$u = (1-\bar{\theta}(c))\pi* + \bar{\theta}(c)(s*\bar{\alpha}(b) + t*\bar{\alpha}(a)(1-\bar{\alpha}(b)) + (s*\Gamma_1 + t*\Gamma_2 + l - \Gamma_1 - \Gamma_2)(1-\bar{\alpha}(a))(1-\bar{\alpha}(b)))$"

and insert -- $(1-\bar{\theta}(c))\pi* + \bar{\theta}(c)(s*\bar{\alpha}(b) + t*\bar{\alpha}(a)(1-\bar{\alpha}(b)) + (s*\Gamma_1 + t*\Gamma_2 + l - \Gamma_1 - \Gamma_2)(1-\bar{\alpha}(a))(1-\bar{\alpha}(b)))$ --, therefor.

In column 6 (Eq. 12), lines 62–63, delete "$\delta(r_1, r_2, \ldots, r_m)$" and insert -- $\delta(<r_1, r_2, \ldots, r_m>)$ --, therefor.

In column 7, line 13, delete "where".

In column 7, line 14, insert -- where -- below equation

In column 7, line 15, delete "$p_1(1-\bar{\alpha})(a))$" and insert -- $p_1(1-\bar{\alpha}(a))$ --, therefor.

In column 7, line 16, delete "$q_2(1-\bar{\alpha})(a))$" and insert -- $q_2(1-\bar{\alpha}(a))$ --, therefor.

In column 7, line 17, delete "$+(1-\bar{\alpha})(a))$" and insert -- $+(1-\bar{\alpha}(a))$ --, therefor.

In column 8, line 20, after "simpler" insert -- ⊗ --.

In column 8 (Eg:1.1), line 51, delete "u=st," and insert -- $u = s \oplus t$, --, therefor.

In column 8 (Eg:1.2), line 53, delete "v=ut." and insert -- $v = u \oplus t$. --, therefor.

UNITED STATES PATENT AND TRADEMARK OFFICE
CERTIFICATE OF CORRECTION

PATENT NO. : 7,086,040 B2
APPLICATION NO. : 09/773211
DATED : August 1, 2006
INVENTOR(S) : Joisha et al.

It is certified that error appears in the above-identified patent and that said Letters Patent is hereby corrected as shown below:

In column 8, line 59, delete "v=(st)t." and insert -- $v = (s \oplus t) \oplus t.$ --, therefor.

In column 8, line 61, after "FIG. 6," insert -- $\otimes$ --.

In column 8, line 63, delete "v=s(tt)." and insert -- $v = s \oplus (t \oplus t).$ --, therefor.

In column 8, line 64, after "FIG. 6," insert -- $\otimes$ also --.

In column 8 (Eg:1.3), line 67, delete "v=st." and insert -- $v = s \oplus t.$ --, therefor.

In column 9 (Eg:2.1), line 33, delete "$u_1=s_{i-1}t$" and insert -- $u_i = s_{i-1} \oplus t$ --, therefor.

In column 9, line 35, delete "$u_l$" and insert -- $u_i$ --, therefor.

In column 9, line 35, delete "$s_l$" and insert -- $s_i$ --, therefor.

In column 9, line 36, delete "(i>1)" and insert -- (i≥1) --, therefor.

In column 9 (Eg:2.2), line 39, delete "$s_l=u_l$" and insert -- $s_i = u_i$ --, therefor.

In column 9, line 44, delete "$s_l=s_{i-1}t.$" and insert -- $s_l = s_{i-1} \oplus t.$ --, therefor.

In column 9, line 45, delete "∴$s_l=(s_{i-2}Ot)t.$" and insert -- ∴$s_l = (s_{i-2} \oplus t) \oplus t.$ --, therefor.

In column 9, line 47, after "FIG. 6," insert -- $\otimes$ --.

In column 9, line 49, delete "$s_l=s_{i-2}(tt).$" and insert -- $s_i = s_{i-2} \oplus (t \oplus t).$ --, therefor.

In column 9, line 53, delete "$s_l=s_{i-2}t.$" and insert -- $s_i = s_{i-2} \oplus t.$ --, therefor.

UNITED STATES PATENT AND TRADEMARK OFFICE
CERTIFICATE OF CORRECTION

PATENT NO. : 7,086,040 B2
APPLICATION NO. : 09/773211
DATED : August 1, 2006
INVENTOR(S) : Joisha et al.

It is certified that error appears in the above-identified patent and that said Letters Patent is hereby corrected as shown below:

In column 9 (Eg:2.3), line 56, delete "$s_i = s_0 t$" and insert -- $s_i = s_0 \oplus t$ --, therefor.

Signed and Sealed this

Fifteenth Day of May, 2007

JON W. DUDAS
*Director of the United States Patent and Trademark Office*